March 23, 1948. H. G. DOLK 2,438,388
FISHING POLE HOLDER
Filed May 8, 1946
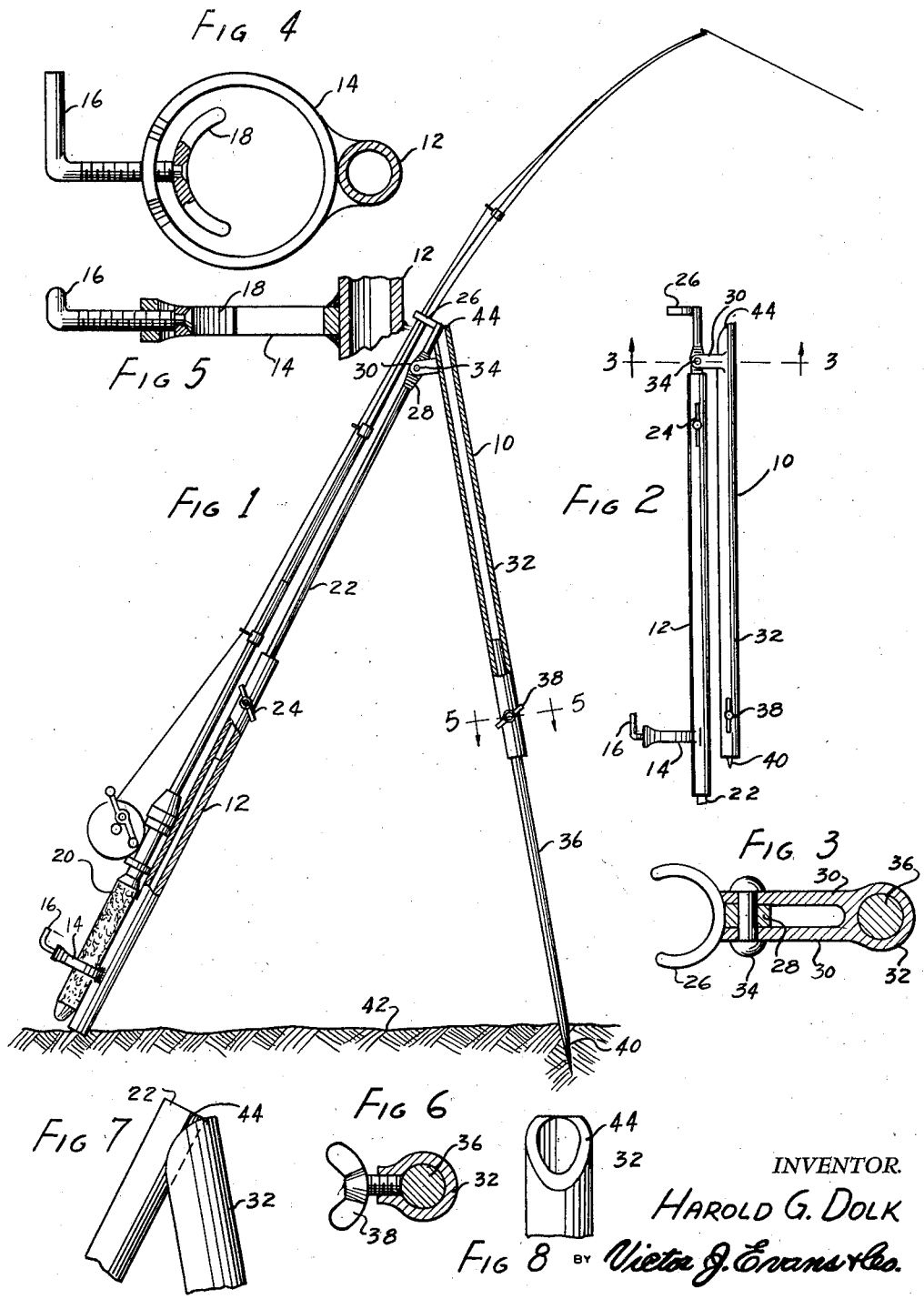
INVENTOR.
HAROLD G. DOLK
BY Victor J. Evans & Co.
ATTORNEYS Patented Mar. 23, 1948

2,438,388

UNITED STATES PATENT OFFICE 2,438,388

FISHING POLE HOLDER

Harold George Dolk, Hoquiam, Wash., assignor of one-half to Clarence M. Manker, Portland, Oreg.

Application May 8, 1946, Serial No. 668,120

1 Claim. (Cl. 248—42)

This invention relates to a fishing rod holder the main object of which is to hold the fishing rod in position while fishing with a rod equipped with a reel and line.

An object of the invention is to provide a device that is simple and being convenient to use will save considerable time during the actual fishing period.

It enables the angler to arrange his equipment, cast his line, and set his rod firmly in the ground or in a log and perform other duties which need his immediate attention thus economizing time and adding pleasure to one of America's most popular outdoor sports.

Another object of the invention is to provide a device which enables the angler to quickly and easily mount his rod in the holder or remove it therefrom while still maintaining complete control of the reel attached to the rod.

With the above and other objects and advantages in view the invention consists of the novel details of construction, arrangement and combination of parts more fully hereinafter described, claimed and illustrated in the accompanying drawing in which:

Fig. 1 is an elevational view partly in section of an embodiment of the invention in position for supporting a fishing rod;

Figure 2 is an elevational view of the device in folded position;

Figure 3 is a sectional view on the line 3—3 of Figure 2;

Figure 4 is a cross sectional view of the lower end of the device;

Figure 5 is a cross sectional view of Figure 4;

Figure 6 is a sectional view on the line 6—6 of Figure 1;

Figure 7 is a detailed view of the upper end of the device; and

Figure 8 is a front view of the ground, supporting member of the device.

Referring more in detail to the drawing the reference numeral 10 designates the fishing rod support, which comprises the tubular member 12 which may be of any length desired.

Secured to the lower end of the member 12 is a metal ring 14 which as shown is positioned on the outer circumference of the member 12. The ring 14 is provided with an adjusting screw 16 at the medial point thereof diametrically opposite the member 12 and a semi-circular collar 18 pivotally mounted thereon is adapted to engage the fishing rod 20 for firmly securing the rod in the ring 14.

Telescopically mounted in the member 12 is the member 22 which can be retained in any desired position in the member 12 by the set screw 24. Secured to the free end of the member 22 is a semi circular member 26 which is adapted to receive the upper end of the fishing rod 20 and support the same in alignment with the members 12 and 22.

The member 22 is flattened at 28 to receive the opposed parallel projections 30 formed on the tubular member 32 and a pin 34 pivotally connects the members 22 and 32 together.

Telescopically mounted in the member 32 is the rod like member 36 which can be retained in any desired position in the member 32, of the set screw 38. The member 36 being pointed at its free end at 40 for insertion into the ground 42 or into a log for supporting the holder as desired.

To permit the rod 20 to be set at the right angle when in fishing position, the upper end of the member 32 is provided with an ovalized bevelled face 44 which due to the formation of the member 32 engages the member 22 as shown in Figure 7 to maintain the members 22 and 32 at the right angle.

When the device is employed for the purpose of supporting a fishing rod the sharpened end 40 of the member 36 is forced into the ground 42, and the member 12 is adjusted rearwardly to support the rod. The movement of the member 12 being controlled by the face 44 of the member 32 so that the member 12 engages the ground in alignment with and to the rear of the member 36. Members 22 and 32 can then be adjusted to the proper height and retained in position by the set screws 24 and 38. The rod is then placed in the ring 14 and member 26 and the screw 16 tightened to retain the rod in proper position.

Thus the rod is easily supported for fishing and can be easily removed from this position for the purpose of playing a fish.

The member may also be driven into a log for the supporting of the holder if desired.

It is believed that the operation and construction of the device will be apparent to those skilled in the art and it is to be understood that changes in the details of construction may be resorted to providing they fall within the spirit of the invention and the scope of the appended claim.

Having thus described the invention, what is claimed as new and desired to be secured by Letters Patent is:

A device of the character described, comprising several tubular members, an ovalized bevelled face on the upper end of one of said tubular members which is adapted to engage the rod-like member in the other tubular member to limit the pivotal movement of said rod-like member and said tubular member, rod like members telescopically mounted in said members, a pair of opposed parallel projections formed on the tubular member having the ovalized bevelled face below said face and a pin connecting said projections to said rod-like member for pivotally connecting said tubular member to said rod like member and means on one of said tubular members and said rod like members for supporting a fishing rod in parallel alignment therewith.

HAROLD GEORGE DOLK.

REFERENCES CITED

The following references are of record in the file of this patent:

UNITED STATES PATENTS

| Number | Name | Date |
|---|---|---|
| 795,523 | Leasure et al. | July 25, 1905 |
| 1,470,123 | Smith | Oct. 9, 1923 |
| 2,311,823 | Gaskill | Feb. 23, 1943 |